(12) United States Patent
Demain

(10) Patent No.: US 7,119,139 B2
(45) Date of Patent: Oct. 10, 2006

(54) MODIFIED POLYPROPYLENE RESINS

(75) Inventor: Axel Demain, Tourinnes-Saint-Lambert (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/498,258

(22) PCT Filed: Dec. 6, 2002

(86) PCT No.: PCT/EP02/14082

§ 371 (c)(1),
(2), (4) Date: Dec. 7, 2004

(87) PCT Pub. No.: WO03/051985

PCT Pub. Date: Jun. 26, 2003

(65) Prior Publication Data

US 2005/0107516 A1     May 19, 2005

(30) Foreign Application Priority Data

Dec. 17, 2001  (EP) .................................. 01204967

(51) Int. Cl.
*C08L 23/12* (2006.01)

(52) U.S. Cl. ....................................... 524/451; 525/240

(58) Field of Classification Search ................ 524/451; 525/240

See application file for complete search history.

(56) References Cited

U.S. PATENT DOCUMENTS

| 5,663,268 A | * | 9/1997 | Winter et al. ............. 526/348.1 |
| 6,300,419 B1 | * | 10/2001 | Sehanobish et al. ......... 525/191 |
| 6,653,385 B1 | * | 11/2003 | Wang et al. ................ 524/425 |

* cited by examiner

*Primary Examiner*—Robert D. Harlan
(74) *Attorney, Agent, or Firm*—William D. Jackson; Tenley R. Krueger

(57) ABSTRACT

The present invention relates to polypropylene resin compositions comprising a syndiotactic polypropylene incorporating at least one particulate material or chemical additive.

20 Claims, 1 Drawing Sheet

MODIFIED POLYPROPYLENE RESINS

Figure 1:
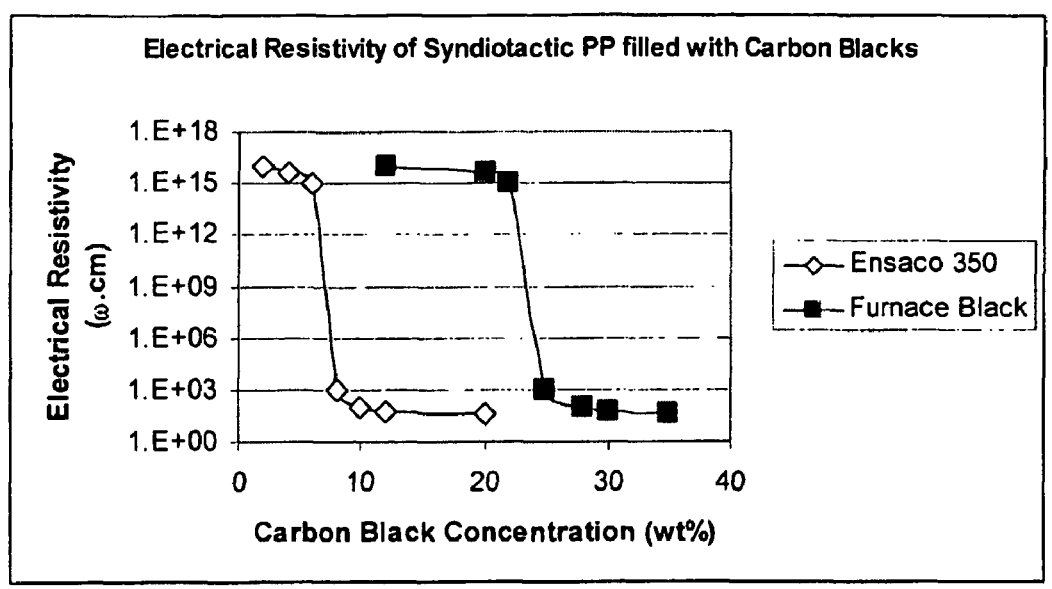

The present invention relates to modified polymer resins that can be used either alone or in dust-free master-batches.

It is known in the art that the properties of a polymer may be modified by introducing particulate material or chemical additives into the polymer resin matrix in order to produce a composite material. The particulate material or chemical additive is selected depending on the desired properties of the composite material. Particulate materials are typically introduced into polymer resins for increasing the mechanical properties of the resin, for example the rigidity or wear resistance, the thermal properties and/or the electrical properties, or they are introduced to confer new functionalities to the polymers such as for example flame retardant or anti-microbial properties.

For example, JP-A-60-023432 discloses a composite resin composition composed of polypropylene, mica treated with an organosilane compound, modified polyolefin and glass fibre treated with an organosilane compound. The composition is stated to have high rigidity and excellent fluidity, shrinkage anisotropy and retention of flexural strength at a weld part.

JP-A-02-173048 discloses a polyolefin resin composition incorporating an inorganic filler, such as precipitated calcium carbonate, for improving the impact strength without impairing the rigidity of the composition.

JP-A-60-020947 discloses a resin composition for use in the production of packaging boxes consisting of polypropylene, high density polyethylene, an inorganic filler such as calcium carbonate and a modified polyolefin. The resultant composition is stated to have improved properties such as an excellent hinge at a fold, embossing characteristics, printability, adhesion and water resistance.

JP-58-040602 discloses a resin composition for an acoustic material composed of polypropylene, an inorganic filler such as calcium carbonate or talc, polyethylene and a modified polyolefin. The composition exhibits high impact strength, flowability and good acoustic properties.

When particulate fillers are incorporated into polypropylene which has been produced using a Ziegler-Natta catalyst (hereinafter Ziegler-Nafta polypropylene (znPP)) or a metallocene catalyst (hereinafter metallocene polypropylene (mPP)), for example by compounding the polypropylene and the particles added thereto in an extruder or in a Brandburry malaxor, there tends to be an undesired dramatic increase in brittleness accompanying the increase in the concentration of the particulate material.

The present invention aims to provide polymer resin compositions incorporating particulate materials or chemical additives, said resins having improved properties.

Accordingly, the present invention provides a polymer resin comprising syndiotactic polypropylene (sPP) incorporating at least one particulate material or chemical additive.

The present invention is predicated on the discovery by the present inventor that with syndiotactic polypropylene (sPP) a much higher concentration of particles in the resin can be achieved compared to znPP, yet with the composite material tending to retain a higher flexibility and impact resistance compared to the corresponding properties obtainable with a particulate material incorporated into znPP.

The syndiotactic polypropylene is preferably a homopolymer or a random copolymer with a rrrr of at least 70%. The sPP may alternatively be a block copolymer having a higher comonomer content, or a terpolymer. Preferably, the sPP has a melting temperature of up to 160° C. and typically, it has two melting peaks, the positions of which depend upon the percentage of racemic pentad in the sPP. The sPP has a melt flow index MI2 of from 0.1 to 1000 g/10 min, preferably of from 1 to 60 g/10 min. The MI2 is measured following the method of standard test ASTM D 1238 at a temperature of 230° C. and under a load of 2.16 kg. The sPP may have a monomodal or a multimodal molecular weight distribution, and more preferably it has a bimodal molecular weight distribution in order to improve the processability. The molecular weight distribution is defined by the dispersion index D that is the ratio $D=Mw/Mn$ of the weight average molecular weight Mw to the number average molecular weight Mn.

The filled sPP can be used in blends with a metallocene-produced polyethylene (mPE) and/or a linear low density polyethylene (LLDPE) prepared by any known method in the art and/or a polypropylene prepared with a Ziegler-Natta catalyst (znPP) or prepared with a metallocene catalyst (mPP). The blend comprises more than 20 wt % of sPP, based on the total weight of the polymers in the blend.

In one preferred aspect of the invention, the particles are incorporated into the sPP in order to improve mechanical properties such as wear resistance. The particulate material may comprise at least one of alumina, chopped glass fibres, chopped carbon fibres, calcium carbonate, carbon black, silicon beads or particles, graphite or nanoparticles. The incorporation of these particulate materials into syndiotactic polypropylene enables a much higher particulate concentration to be achieved as compared to znPP, yet retaining a very good impact resistance and flexibility, thereby allowing manipulation of the composite material without breaking it. Such sPP resins having improved wear resistance may be used for technical parts or floor coverings.

In accordance with another aspect of the invention, the electrical conductivity of the syndiotactic polypropylene may be improved by the incorporation of electrically conductive particles as a filler into the syndiotactic polypropylene. The electrically conductive particles may comprise at least one of carbon black, carbon fibres, metallic particles, or particles coated with electrically conductive material.

The electrical conductivity of the composite material depends upon the concentration of the filler particles in the syndiotactic polypropylene. At low filler concentrations, the filler particles form clusters wherein the particles touch each other but the clusters are individual and separated from each other. With such a concentration range and such morphology, the composite is considered to be an electrically insulative material. However, the electrical conductivity generally increases with increasing filler concentration. Accordingly, the use of electrically conductive particles as a filler permits the manufacture of a composite having improved static electricity dissipation as compared to pure syndiotactic polypropylene.

With a yet further increase in the filler concentration, the particulate clusters start to touch each other, thereby forming an electrically conductive body in the polymer matrix. In a very narrow range of increasing particulate concentration, the electrical resistivity of the composite suddenly drops, and the material becomes electrically conductive. Such a concentration range is known as the "percolation threshold". Above the percolation threshold, any further increase in the filler concentration results in a further increase of the electrical conductivity.

The concentration value at the percolation threshold depends on the type and geometry of the filler particles. For elongate filler particles, the higher the aspect ratio (or the shape factor defined as the ratio of the largest to the smallest characteristic dimensions: for a fibre, the shape ratio is L/D, the ratio of length to diameter) of the particles, the smaller the value of the concentration at the percolation threshold. For carbon black particles, the more spherical the particles, the higher the percolation threshold. In contrast, highly structured carbon black particles, i.e. particles of a complex shape, usually made from spheres merged into each other, provide composites with a much lower percolation threshold.

Composite materials having improved electrical conductivity have a variety of different applications. For example, syndiotactic polypropylene when filled with particles such as carbon black or other electrically conductive materials can produce sPP having improved static electricity dissipation (i.e. low static electricity sPP), and may be used in applications requiring dissipation of static charges such as in fibres for carpets, materials for avoiding dust accumulation, and the shielding or housing of electric or electronic components. Composite materials having improved electrical conductivity also have application as electromagnetic shielding materials, for example for housing of electronic components, in mobile telephones, televisions or radios, if the concentration of the electrically conductive filler is around or above the percolation threshold.

In a further aspect of the invention, the thermal conductivity of syndiotactic polypropylene is improved by the incorporation into the sPP matrix of at least one thermally conductive filler, such as carbon fibres, carbon black, graphite particles, metallic particles or alumina particles. As for improving the electrical conductivity, the thermal conductivity also has a percolation threshold concentration for the increase in thermal conductivity but the increase in thermal conductivity at the percolation threshold is much less pronounced than for electrical conductivity. Composite resins having improved thermal conductivity have applications as heat sinks for thermal management, or electronic device housings.

The syndiotactic polypropylene composites in accordance with the invention are preferably prepared by adding the particulate material or chemical additives to the syndiotactic polypropylene by blending or compounding the materials together in an extruder or Brandburry malaxor. Alternatively, the syndiotactic polypropylene may be dissolved into a solvent, such as for example xylene and the particulate material can be dispersed in the solution. Thereafter the solvent is removed by filtration, sublimation or evaporation to produce the composite material.

In a yet further alternative method, the syndiotactic polypropylene, which may be in the form of powder, pellets or fibres, may be dispersed in water or any other liquid in which the particulate filler is also dispersed. Thereafter, the liquid is flushed away, in leaving an intimate blend of syndiotactic polypropylene and filler. This mixture can be hot pressed or laminated and then further ground or re-extruded. This preparation technique has a particular application for the manufacture of composite materials where the particulate material exhibits a high aspect ratio, which is to be preserved in the ultimate composite material.

The maximum filler concentration depends both on the nature and composition of the polymer and of the particulate material, in particular the geometry of the particulate material. For particulate materials having a large aspect ratio, as a rule the maximum concentration of particulate material in the polymer is low. With regard to the percolation threshold, as soon as the percolation threshold concentration is obtained, the rigidity and brittleness of the composite tends to increase dramatically. For composite materials prepared using exactly the same conditions with identical fillers, the percolation threshold tends to be slightly higher with syndiotactic polypropylene as compared to Ziegler-Natta polypropylene. Furthermore, the use of syndiotactic polypropylene as compared to Ziegler-Natta polypropylene tends to result in a more flexible composite material which also exhibits a very good impact resistance, even above the percolation threshold concentration.

The sPP has several other advantages such as transparency that makes it useful for intermediate layers in packaging with changing light effect and such as adequate temperature range for colorants that makes it useful for black parts in the automotive market.

EXAMPLES

The syndiotactic polypropylene was produced with a cyclopentadienyl-fluorenyl metallocene catalyst and had a melt flow index MI2 of 3.6 g/10 min as measured following the method of standard test ASTM D 1238 at a temperature of 230° C. and under a load of 2.16 kg. It had two melting peaks respectively at 110 and at 127° C., a number average molecular weight (Mn) of 37426, a weight average molecular weight (Mw) of 160229 and a molecular weight distribution of 4.3. The molecular weight distribution is defined here by the dispersion index (D) that is the ratio Mw/Mn. The density was 0.89 g/cm$^3$, as measured at 23° C. following the method of standard test ASTM D 1505.

It has been blended respectively:

with the anti-microbial Irgaguard B 1000 from CIBA in order to produce various woven or non-woven materials used for example in hygiene;

with the anti-algae Irgaguard A 2000 from CIBA in order to produce fibres used in medical, agricultural or marine applications;

with the anti-static Irgastat P22 from CIBA in order to control the static electricity in fabrics or in carpets;

with the flame retardant Flamestab NOR 116 from CIBA in order to prepare woven or non-woven material used for example in upholstery, carpets, carpet backings, professional and ordinary clothing;

with of the anti-UV Tinuvin 783 from CIBA, that is a synergistic mixture of chimassorb 944 and Tinuvin 622 or with 1 to 10 wt % of chimassorb 2020 from CIBA in order to prepare material for use in the textile industry;

with fillers such as kaolin or metal powders in order to increase the density of the fiber above 1 g/cm$^3$ for use in the paper industry. In addition, the sPP will improve the rigidity of the finished product. More generally, the filler can be a weight additive that increases the density of the composition above that of the reference immersing fluid.

with carbon black in order to improve the anti-static properties of the woven or non-woven material.

Several types of "black" additives have been tested in order to increase the electrical conductivity of polyolefin material. FIG. 1 represents the electrical resistivity expressed in ohm.cm as a function of the concentration of the "black" additive expressed in wt %. It is observed that in all cases, the resistivity decreases rapidly as a function of increasing concentration of the "black" additive past a threshold that is a function of the nature of the additive. For additives made of nearly spherical particles such as furnace black, the threshold is very high and concentrations of 25 to 50 wt % of additive in the sPP are necessary to observe a decrease in resistivity. For additives having highly structured particles such as the product sold by MMM under the name Ensaco 350, the threshold is very low and concentrations of 9 to 15 wt % of additive in the sPP are necessary to observe a decrease in resistivity.

The impact test performed on the filled sPP give good to outstanding results depending upon the nature and the amount of the fillers used.

The filled sPP according to the present invention can either be used alone as a master batch or it can be blended with one or more polymers selected from znPP, mPE or LLDPE.

The invention claimed is:

1. A polymer composition comprising:
   A polymer component consisting essentially of:
      a first polymer, wherein the first polymer is a crystalline polymer selected from polypropylene resins prepared with a Ziegler-Natta catalyst, polypropylene resins prepared with a metallocene catalyst, polyethylene resins and combinations thereof; and
      at least 20 wt. % of a second polymer, wherein the second polymer comprises a syndiotactic propylene polymer incorporating at least one filler additive, the filler additive selected from particulate material, chemical additives and combinations thereof; and
   wherein the polymer composition has a characteristic of at least one of flexibility and impact resistance which is higher than the corresponding characteristic exhibited by the first polymer incorporating the filler additive without the presence of the second polymer.

2. The polymer composition of claim 1, wherein said first polymer comprises a metallocene-produced polyethylene or a linear low-density polyethylene.

3. The polymer composition of claim 2 wherein said first polymer is a linear low density polypropylene.

4. The polymer composition of claim 1, wherein said first polymer component comprises a polypropylene prepared with a Ziegler-Natta catalyst or prepared with a metallocene catalyst.

5. The polymer composition of claim 1, wherein said syndiotactic propylene polymer has a racemic pentad content of at least 70%.

6. The polymer composition of claim 5 wherein said syndiotactic propylene polymer has a bimodal molecular weight distribution.

7. The polymer composition of claim 1, wherein said filler additive is a particulate material.

8. The polymer composition of claim 7 wherein said particulate material is selected from the group consisting of glass fibers, carbon fibers, alumina particles, calcium carbonate particles, carbon black particles, silicon particles, graphite particles and mixtures thereof.

9. The polymer composition of claim 7 wherein said particulate material comprises electrically conductive particles in a concentration at least as great as the percolation threshold for electrical conductivity.

10. The polymer composition of claim 7 wherein said particulate material comprises heat conductive particles in a concentration at least as great as the percolated threshold for thermal conductivity.

11. The polymer composition of claim 7 wherein said particulate material is an anti-microbial additive.

12. The polymer composition of claim 7 wherein said particulate material is a flame retardant additive.

13. The polymer composition of claim 7 wherein said particulate material is an anti-static additive.

14. The polymer composition of claim 7 wherein said particulate material is an anti-UV additive.

15. The polymer composition of claim 7 wherein said particulate material is a weight additive having a density greater than the density of said polymer composition.

16. The polymer composition of claim 7 wherein the particulate material is an anti-algae additive.

17. The polymer composition of claim 7 wherein the particulate material is a carbon black additive.

18. The polymer composition of claim 7 wherein the particulate material is a carbon fiber additive.

19. The polymer composition of claim 7 wherein the particulate material is a mineral filler.

20. The polymer composition of claim 7 wherein the particulate material is a fungicide.

* * * * *